(12) United States Patent
Pozo Torres et al.

(10) Patent No.: US 11,867,147 B2
(45) Date of Patent: Jan. 9, 2024

(54) ASSEMBLY TOOLS AND METHODS FOR A DIRECT DRIVE WIND TURBINE GENERATOR

(71) Applicant: General Electric Renovables Espana, S.L., Barcelona (ES)

(72) Inventors: Pablo Pozo Torres, Barcelona (ES); Alvaro Frances Perez, Barcelona (ES); Josep Bosch-Collado, Barcelona (ES); Isidre Guasch Aragonès, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/846,163

(22) Filed: Jun. 22, 2022

(65) Prior Publication Data

US 2022/0412316 A1 Dec. 29, 2022

(30) Foreign Application Priority Data

Jun. 23, 2021 (EP) .................................. 21382554

(51) Int. Cl.
*F03D 13/10* (2016.01)

(52) U.S. Cl.
CPC ........ *F03D 13/10* (2016.05); *F05B 2220/706* (2013.01); *F05B 2230/60* (2013.01)

(58) Field of Classification Search
CPC .......... F03D 13/10; F03D 80/00; F03D 80/82; F03D 1/0691; F03D 15/20; F03D 17/00; B25B 11/02; F05B 2230/60; F05B 2220/706; F05B 2220/7066
See application file for complete search history.

(56) References Cited

U.S. PATENT DOCUMENTS

| 9,701,235 | B2 | 7/2017 | Poulsen et al. |
| 9,793,766 | B2 | 10/2017 | Cortada Acosta |
| 2012/0228881 | A1 | 9/2012 | Siegfriedsen |

(Continued)

FOREIGN PATENT DOCUMENTS

| CN | 108975243 A | 12/2018 |
| EP | 2746570 A1 | 6/2014 |

(Continued)

OTHER PUBLICATIONS

Partial European Search Report Corresponding to EP21382554 dated Nov. 17, 2021.

(Continued)

*Primary Examiner* — Moshe Wilensky
(74) *Attorney, Agent, or Firm* — Dority & Manning, P.A.

(57) ABSTRACT

The present disclosure relates to methods and tools for assembling a hub and a generator for a wind turbine, and more particularly to methods and tools for assembling a hub, a generator and a main frame for a direct-drive wind turbine. A method comprises providing a wind turbine hub, a generator and a main frame. The method further comprises vertically moving at least one of the hub and the generator towards the other of the hub and the generator; attaching the hub and the generator to form a hub-generator assembly; turning the hub-generator assembly while gripping the wind turbine hub; and attaching the hub-generator assembly to the main frame.

13 Claims, 9 Drawing Sheets

(56) References Cited

U.S. PATENT DOCUMENTS

2016/0131105 A1* 5/2016 Westergaard ............. F03D 1/06
                                                    29/281.5
2016/0369522 A1* 12/2016 Sanz Pascual ........ E04B 1/1909
2021/0071380 A1* 3/2021 Rico Arenal ........... E02D 27/52
2023/0070230 A1* 3/2023 Reinders ................ F03D 13/25

FOREIGN PATENT DOCUMENTS

KR          102070855  B1     1/2020
WO     WO2008/148874  A1    12/2008

OTHER PUBLICATIONS

Extended European Search Report Corresponding to EP21382554 dated Feb. 17, 2022.

* cited by examiner

ASSEMBLY TOOLS AND METHODS FOR A DIRECT DRIVE WIND TURBINE GENERATOR

The present disclosure relates to methods and tools for assembling a hub and a generator for a wind turbine, and more particularly to methods and tools for assembling a hub, a generator and a frame for a direct-drive wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through a gearbox. This way, the generator produces electricity which can be supplied to the electrical grid.

In wind turbines with a gearbox, the gearbox usually increases the speed of the wind-driven rotor and therefore the required size of the generator may be reduced. In contrast, directly driven generators, operate at the same rotational speed as the rotor. These generators therefore generally have a much larger diameter than generators used in wind turbines having a gearbox for providing a similar amount of power than a wind turbine with a gearbox.

A direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, generators may also be coupled to a gearbox which increases the rotational speed of the generator to for example between 50 to 500 rpm or even more.

A generator generally comprises a rotor, a stator and an air gap separating the rotor and the stator, for example radially. The stator may be an inner structure and the rotor may surround the stator. A generator may be a permanent magnet excited generator (PMG).

Permanent magnets (PM) are generally comprised in the rotor (although they could also be alternatively arranged in the stator structure), whereas winding elements (e.g. coils) are usually included in the stator (although they could alternatively be arranged in the rotor structure). An air gap separates the permanent magnets and the coils. Permanent magnet generators are generally deemed to be reliable and require less maintenance than other generator typologies. This is an important reason why permanent magnet generator are employed in offshore wind turbines, and particularly in direct drive offshore wind turbines.

In direct drive wind turbines, a frame is generally provided above the tower. A frame usually supports the hub and the generator, and transfers loads to the tower. A frame, or at least a portion of a frame, may be made of cast steel. A nacelle, which is a housing arranged on top of a wind turbine tower, may cover and protect at least a portion of the frame.

Once a generator for a direct drive wind turbine is assembled, i.e. the rotor and the stator have been assembled, it has to be joined to a wind turbine hub and to a frame. For example, the generator may be lifted and horizontally attached to the frame. Then, the hub may be attached to the generator, also horizontally.

Due to the size and the weight of the generator, appropriate tools for lifting it and moving it are required. In particular, the generator must be handled with care for avoiding deforming the stator and/or the rotor, and therefore deforming the air gap between them.

In order to minimize the risk of air gap collapse while handling the generator, the generator may be reinforced. For example, one or more reinforcements may be attached to the generator for conferring additional rigidity to it before joining it to the frame. Mounting the reinforcements to the generator and removing them once the generator has been joined to the frame and the hub is time consuming. Specific tools able to manipulate the reinforced generator may also be necessary.

SUMMARY

In an aspect of the present disclosure, a method is provided. The method comprises providing a wind turbine hub, a main frame and a generator. The method further comprises vertically moving at least one of the wind turbine hub and the generator towards the other of the wind turbine hub and the generator; attaching the wind turbine hub and the generator to form a hub-generator assembly; turning the hub-generator assembly while gripping the wind turbine hub; and attaching the hub-generator assembly to the main frame.

According to this aspect, a hub and a generator are first attached, and then flipped via the hub. The hub-generator assembly may then be joined to a main frame. In this way, an air gap of the generator may be protected and may not collapse, as the generator is not manipulated directly. Performing the turning through the hub may enable to have a center of gravity of the hub-generator assembly in the hub, which may avoid deformations in the generator.

Reinforcing the generator may not be necessary, as it is the hub which is flipped.

In a further aspect of the invention, a tool for manipulating a hub is provided. The tool comprises a hub manipulating assembly configured to grip a hub. The tool further comprises two lateral supports for supporting the hub manipulating assembly between them. The hub manipulating assembly is configured to displace along the lateral supports and rotate with respect to the lateral supports.

In a further aspect of the invention a method is provided. The method comprises gripping a hub, wherein a hub portion configured to be attached to a generator is pointing downwards; lifting the hub; lowering the hub over a generator; lifting the hub with the generator attached; and turning the hub with the generator attached.

DETAILED DESCRIPTION OF EXAMPLES

Figure 1:
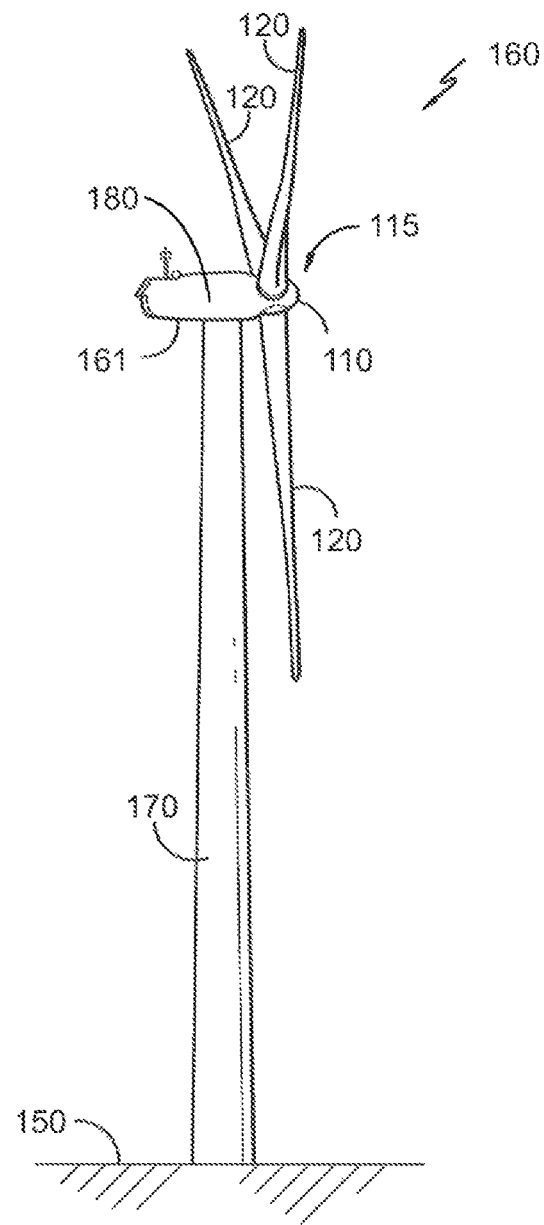
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. In the example, the wind turbine 160 is a horizontal-axis wind turbine. As shown, the wind turbine 160 includes a tower 170 extending from a support surface 150, a nacelle 161 mounted on the tower 170, and a rotor 115 coupled to the nacelle 161. The rotor 115 includes a rotatable rotor hub 110 and at least one rotor blade 120 coupled to and extending outwardly from the rotor hub 110. For example, in the illustrated example, the rotor 115 includes three rotor blades 120. However, in an alternative embodiment, the rotor 115 may include more or less than three rotor blades 120. Each rotor blade 120 may be spaced from the rotor hub 110 to facilitate rotating the rotor 115 to enable kinetic energy to be transferred from the wind into usable mechanical energy, and subsequently, electrical energy. For instance, the rotor hub 110 may be rotatably coupled to an electric generator 3 (FIG. 2) to permit electrical energy to be produced.

The tower 170 may be fabricated from tubular steel to define a cavity (not shown in FIG. 1) between a support surface 150 and the nacelle 161. In an alternative embodiment, the tower 170 may be any suitable type of a tower having any suitable height. According to an alternative, the tower can be a hybrid tower comprising a portion made of concrete and a tubular steel portion. Also, the tower can be a partial or full lattice tower.

In examples, the rotor blades 120 may have a length ranging from about 15 meters (m) to about 90 m, 120 m or more. Rotor blades 120 may have any suitable length that enables the wind turbine 160 to function as described herein. For example, non-limiting examples of blade lengths include 20 m or less, 37 m, 48.7 m, 50.2 m, 52.2 m or a length that is greater than 91 m. As wind strikes the rotor blades 120 from a wind direction, the rotor 115 is rotated about a rotor axis. As the rotor blades 120 are rotated and subjected to centrifugal forces, the rotor blades 120 are also subjected to various forces and moments. As such, the rotor blades 120 may deflect and/or rotate from a neutral, or non-deflected, position to a deflected position.

Moreover, a pitch angle of the rotor blades 120, i.e., an angle that determines an orientation of the rotor blades 120 with respect to the wind direction, may be changed by a pitch system to control the load and power generated by the wind turbine 160 by adjusting an angular position of at least one rotor blade 120 relative to wind vectors. During operation of the wind turbine 160, the pitch system may particularly change a pitch angle of the rotor blades 120 such that the angle of attack of (portions of) the rotor blades are reduced, which facilitates reducing a rotational speed and/or facilitates a stall of the rotor 115.

A blade pitch of each rotor blade 120 may be controlled individually by a wind turbine controller 180 or by a pitch control system. Alternatively, the blade pitch for all rotor blades 120 may be controlled simultaneously by said control systems.

Further as the wind direction changes, a yaw direction of the nacelle 161 may be rotated about a yaw axis to position the rotor blades 120 with respect to wind direction.

The wind turbine controller 180 may be centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

The wind turbine controller 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

The wind turbine 160 of FIG. 1 may be placed in an offshore or onshore location. The wind turbine of FIG. 1 may be a direct-drive wind turbine.

Figure 2:
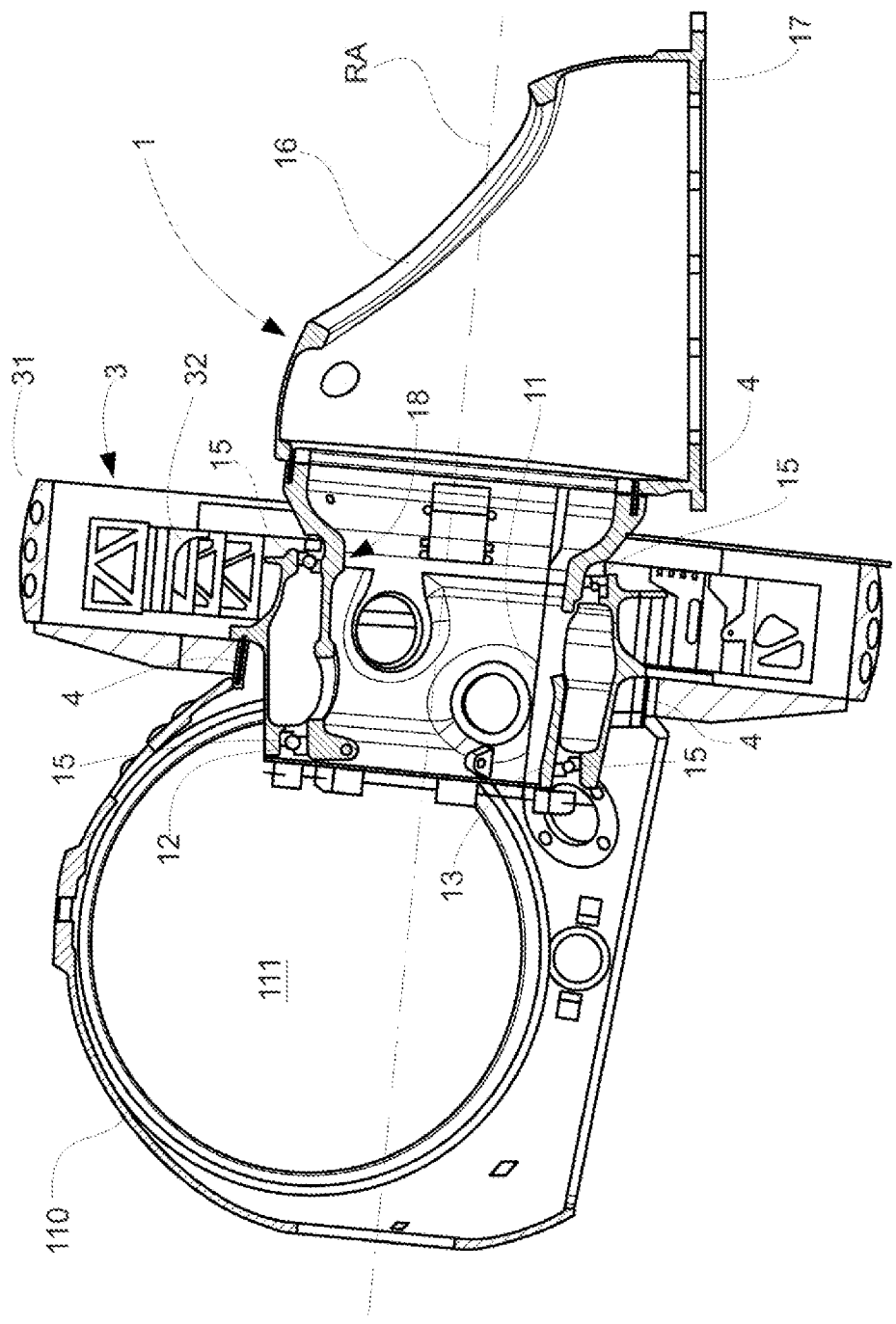
FIG. 2 illustrates a simplified, internal cross-sectional view of one example of the nacelle and a rotor hub of the wind turbine of FIG. 1.

FIG. 2 illustrates a simplified, internal cross-sectional view of the nacelle 161 and the rotor hub 110 of a direct-drive wind turbine 160 such as the one in FIG. 1. Some elements of the wind turbine 160 have not been illustrated for the sake of clarity. As shown, the generator 3 may be coupled to the rotor hub 110 of the wind turbine 160 for generating electrical power from the rotational energy generated. Thus, rotation of the rotor hub 110 drives the generator 3.

It should be appreciated that frame 1 and generator 3 may generally be supported by a support frame or bedplate 17 positioned atop the wind turbine tower 170. The bedplate 17 may be a bottom portion or may be joined to a bottom flange of a frame 1. The nacelle 161 is rotatably coupled to the tower 170. The bedplate 17 may be rotatably coupled to a wind turbine tower 170.

The direct-drive wind turbine 160 of FIG. 2 comprises a generator 3 mounted on a frame 1. The generator 3 comprises a generator stator 32 and a generator rotor 31 configured to rotate about a rotation axis RA. The frame 1 has a rear portion 16 and a front or protruding portion 11. The protruding portion 11 may be integrally formed with the rear portion 16 or may be separate from the rear portion 16. If separate formed, fasteners 4 such as bolts may attach the front 11 and rear 16 portions of the frame 1. The protruding portion 11 extends beyond the generator 3. The rear portion 16 is provided between the front portion 11 and the tower 170.

A rear portion 16 of the frame 1 may be called main frame 16. A main frame may transfer the loads and the vibrations acting on the rotor 115 of a wind turbine 160 to the tower 170 of the wind turbine 160. A main frame may be made of cast steel. A main frame may have a bottom opening, a front opening and a rear opening. The bottom opening may enable passage between the main frame and an inside of the tower 170, the front opening may enable passage between the main frame and an inside 111 of the rotor hub 110, e.g. through a front portion 11, and the rear opening may enable passage between the main frame and an inside of the nacelle 161.

In FIG. 2, the protruding portion 11 extends towards the rotor hub 110 of the wind turbine 160 along the rotation axis RA. Thus, the protruding portion 11 may extend in an upwind direction along the rotation axis RA. At least a part of the protruding portion 11 may be placed in a room 111 defined inside the rotor hub 110. The room 111 may be defined as the hollow body of the rotor hub 110.

A protruding portion 11 of the frame 1 may be called main frame 11. The main frame 11 may comprise a first structure and a second structure. The first and second structures are configured to rotate relative to each other and about the rotation axis RA. The first structure may be attached to the generator stator 32 and the second structure may be attached to the generator rotor 31. The terms first are second are interchangeably herein.

In FIG. 2, the first structure is an inner structure 13 and the second structure is an outer structure 12. In another example, the first structure may be an outer structure and the second structure may be an inner structure. In both examples the inner and the outer structure may rotate relative to each other and about the rotation axis RA.

The outer structure 12 may be operatively connected to the rotor hub 110 through the generator rotor 31. The latter may be achieved, for instance, through a series of bolts 4. The bolts 4 may join together the rotor hub 110, the outer structure 12 and the generator rotor 31 in such a way that at least a part of the generator rotor 31 is sandwiched by the rotor hub 110 and the outer structure 12. This exemplary joint may allow to transmit the rotating movement of the rotor hub 110 to the outer structure 12 through the generator rotor 31. Conversely, if for example the outer structure 12 is braked, then the generator rotor 31 and the rotor hub 110 may be braked as well. In another example, the joint may be achieved through any fasteners available on the market or even through welding.

The first structure, e.g. the inner structure 13, may have a tapered region 18 towards the rotor hub 110. The second structure, e.g. the outer structure 12, may be rotatably mounted on the tapered region 18. I.e., the second structure can rotate about the rotation axis RA and the first structure.

The tapered region 18 may protrude from the generator 3, at least partially, towards the rotor hub 110.

The direct-drive wind turbine 160 may further comprise a pair of bearings 15 between the second structure, e.g. the outer structure 12, and the first structure, e.g. the inner structure 13. The pair of bearings 15 may be spaced apart each other along the rotational axis RA. Alternatively, a single bearing may rotatably connect the first structure and the second structure.

In FIG. 2, the generator rotor 31 rotatably surrounds the generator stator 32. However, in other examples, the generator stator may surround the generator rotor.

Figure 3:
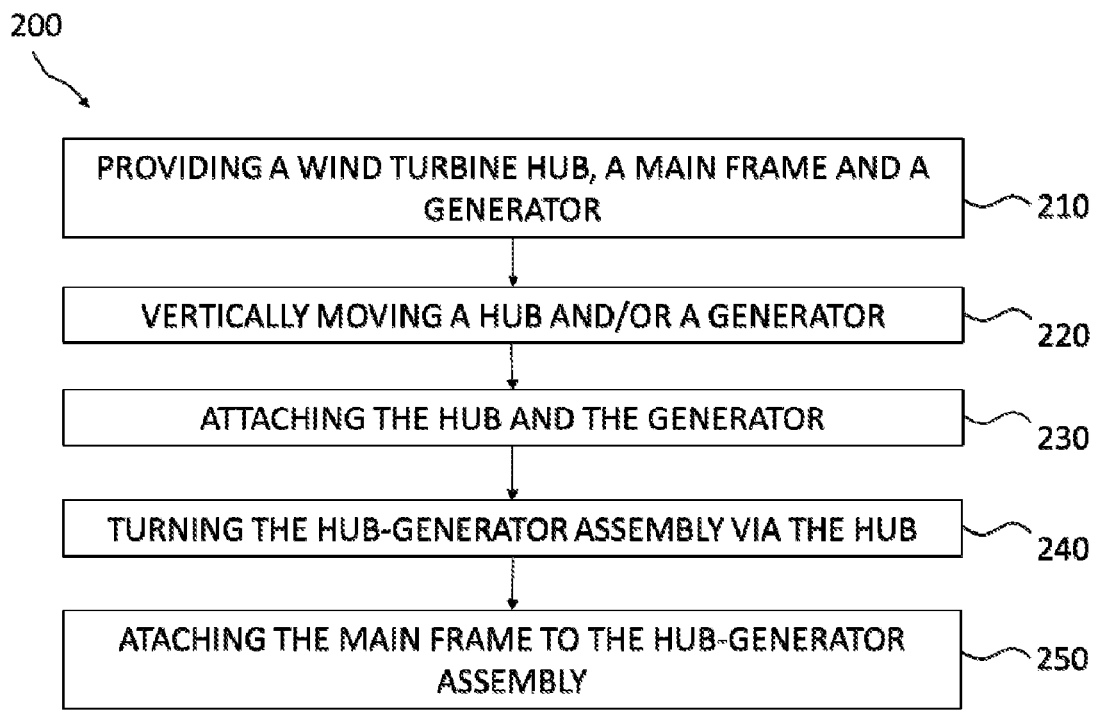
FIG. 3 schematically illustrates a flow chart of a method.

One aspect of the present disclosure provides a method 200. A schematic diagram of the method 200 is provided in FIG. 3. An example of a possible implementation of method 200 is shown in FIGS. 4A-4G. This method 200 may be implemented by using a tool configured to perform the steps of the method 200. An example of such a tool 400 can be seen e.g. in FIGS. 4A-4G and 6.

The method comprises, at block 210, providing a wind turbine hub 110, a generator 3 and a main frame 16. The method comprises, at block 220, vertically moving at least one of the hub 110 and the generator 3 towards the other of the hub 110 and the generator 3. The hub 110 and the generator 3 are brought closer such that a portion of the hub configured to be attached to the generator faces a portion of the generator configured to be attached to the hub. Any generator suitable for a direct drive wind turbine may be used. For example, an electrically excited generator may be used. In other examples, a permanent magnet excited generator may be used. In some examples, the generator may be a superconducting generator.

In some examples, the hub 110 may be lowered towards the generator 3. This has been schematically represented in FIG. 4C. In FIG. 4C, a tool 400 is holding a hub 110 such that a portion of the hub configured to be joined to the generator is pointing downwards. The generator 3 is arranged below the hub 110 such that when the hub is lowered over the generator, the hub and the generator may be attached. The generator can be placed on a generator support 35. In this example, the generator 3 remains still, it is not moved towards the hub 110.

A tool 400 may comprise one or more sensors 443 (see for example FIG. 8) configured to sense the generator 3. For example, lasers and/or cameras may be provided in the tool, e.g. in a hub manipulating assembly 430 of the tool, such that a position of the hub 110 with respect to the generator may be known. A sensor suitable for measuring a distance between the hub 110 and the generator 3 may be used. One or more sensors, targets and/or marks may be provided in the generator 3 for use in conjunction with one or more sensors 443 in the tool 400.

In some other examples, generator 3 may be vertically moved towards the hub 110, for instance by a vertically, e.g. upwards, movable platform. The generator 3 may be moved additionally or alternatively to moving the hub 110. Since the generator is, due to its nature, less stiff than the hub, manipulations of the generator can lead to deformations. In FIGS. 4C and 4D, the generator is kept still. This may help to avoid deformation of an air gap between the stator and the rotor.

In some examples, the generator 3 may be provided already mounted on, e.g. attached to, a front frame 11. The front frame 11 is configured to be attached to the main frame 16. For example, in FIG. 4C, the generator 3 is attached to a front frame 11. Attaching the generator 3 and the front frame 11 may be performed before placing the generator 3 in a suitable position for joining it to the hub 110, e.g. substantially below the hub 110. A front frame 11 may comprise a portion configured to support the generator 3, e.g. an inner structure 13, and a portion configured to be attached to the wind turbine hub 110, e.g. an outer structure 12.

The method further comprises, at block 230, attaching the hub 110 and the generator 3 to form a hub-generator assembly 5. FIG. 4D illustrates this step. Fasteners such as bolts 4 may be used. In general, any suitable type of fastener may be used. If the generator is attached to a front frame 11, the hub 110 may be attached to the portion configured to be attached to the wind turbine hub 110, e.g. to an outer structure 12 as in the example of FIG. 2.

Having the generator 3 on the ground or on a support 35 on the ground may facilitate the attachment of the hub and the generator. Also, manipulation of the generator 3 leading to an air gap collapse may be avoided.

The method further comprises, at block 240, turning, while gripping the hub 110, the hub-generator assembly 5. FIG. 4F depicts an example of this. In FIG. 4F, the tool 400, which grips the hub 110, turns the hub-generator 5 assembly around an axis of rotation 460 (see also e.g. FIGS. 6 and 9). I.e., the hub-generator assembly is flipped from a substantially vertical orientation to a substantially horizontal orientation.

As the axis of rotation 460 crosses the hub 110, the forces and loads are concentrated in the hub. The axis of rotation 460 may lie close to the center of gravity of the hub-generator assembly 5. The hub 110 and the tool 400 are thus used as a counterweight to reinforce the connection with the generator 3. Therefore, contrary to when directly manipulating the generator, e.g. turning the generator by its outer surface, an air gap of the generator 3 may be protected from collapse or deformation. Also, adding reinforcements to the generator for avoiding its deformation may not be necessary.

Before turning the hub-generator assembly 5, the hub-generator assembly may be lifted. Lifting enables having enough space for rotating the hub-generator assembly 5 without damaging it. Lifting also allows positioning the hub-generator assembly 5 at a suitable height (distance above the floor) for joining it to a main frame 16. If a supporting structure 35 has been used for supporting the generator 3 (or the generator 3 and a front frame 11), the structure 35 may be removed before the hub 110 is rotated. The hub-generator assembly 5 has been lifted in FIG. 4E, before rotating it in FIG. 4F.

The hub-generator assembly may be rotated between 70° and 110° (degrees), and specifically between 80° and 100°. For example, the hub-generator assembly may be rotated about 85°, 90° or 95°. Such a rotation may facilitate orienting the hub-generator assembly 5 for joining it to a main frame 16. The tool 400, e.g. a hub manipulating assembly 430 of the tool 400, may be reinforced 445 in a part which is to be below the hub-generator assembly 5 after the turning.

The method further comprises, at block 250, attaching the hub-generator assembly 5 to the main frame 16. A main frame 16 may be moved towards the hub-generator assembly 5, for example in a substantially horizontal direction. If a generator 3 has not been provided already attached to a front frame 11, the main frame 16 may be attached to the front frame 11 before attaching the hub-generator assembly to the main frame 16. Attachment of the hub-generator assembly 5 to the main frame 16 may be by the front frame 11. If the main frame 16 and the front frame 11 are provided as a single piece, moving the main frame 16 includes moving the front frame 11. I.e., frame 1 is moved. A portion of the frame 1, e.g. a portion of the front frame 11, configured to be attached to a hub-generator assembly 5 may be placed facing a portion of the hub-generator assembly 5 configured to be attached to the portion of the frame 1, e.g. a portion of the front frame 11. Sensors may be installed on the hub-generator assembly 5 and/or the frame 1 for helping in aligning them. Targets or marks may additionally or alternatively be placed on any of the hub-generator assembly and the frame.

If the hub-generator assembly 5 includes a front portion 11 of a frame 1, the hub-generator assembly 5 may be in particular attached to a main frame 16. For example, a front frame 11, optionally an inner structure 13 (see FIG. 2), may be attached to the main frame 16. Any suitable fastener, including bolts 4, may be used. For example, nuts and bolts may be used to join a rear flange of an inner structure 13 to a front flange of the main frame 16.

Figure 4A:
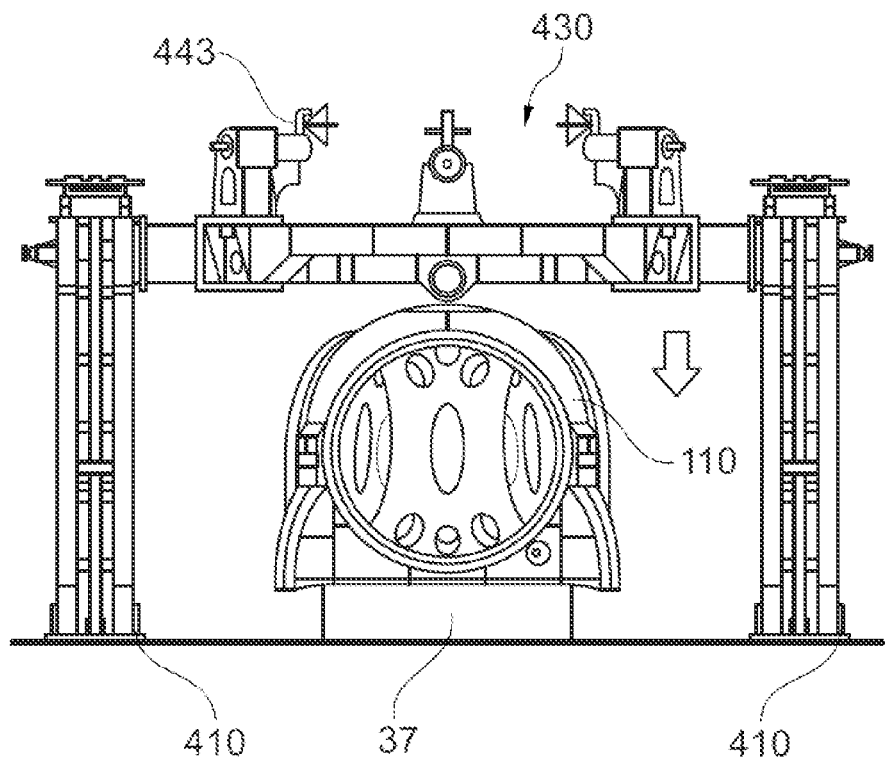
FIGS. 4A-4G schematically and sequentially illustrate an example of an implementation of the method of FIG. 3.
Figure 4B:
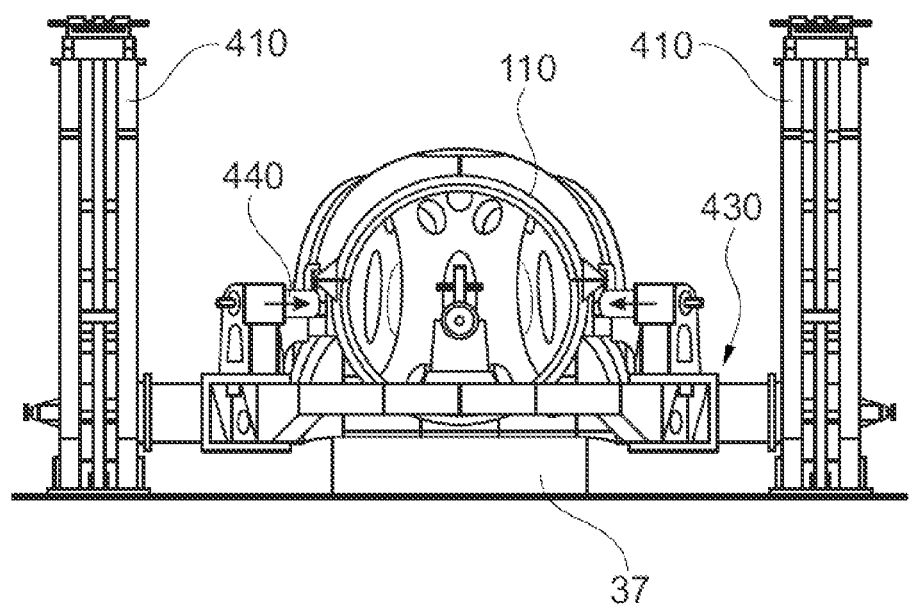
Figure 4C:
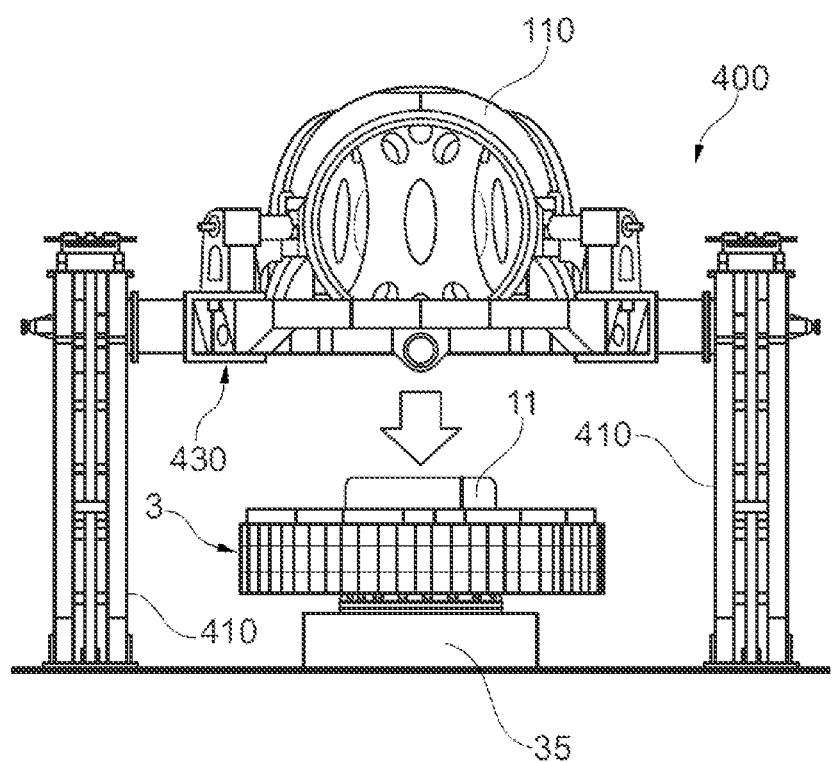
Figure 4D:
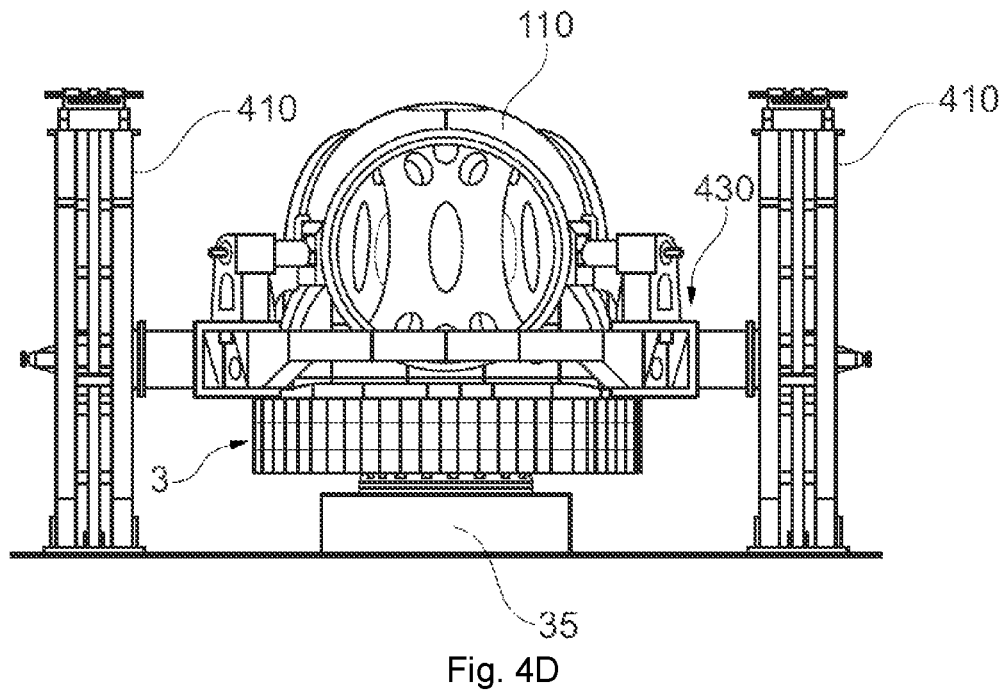
Figure 4E:
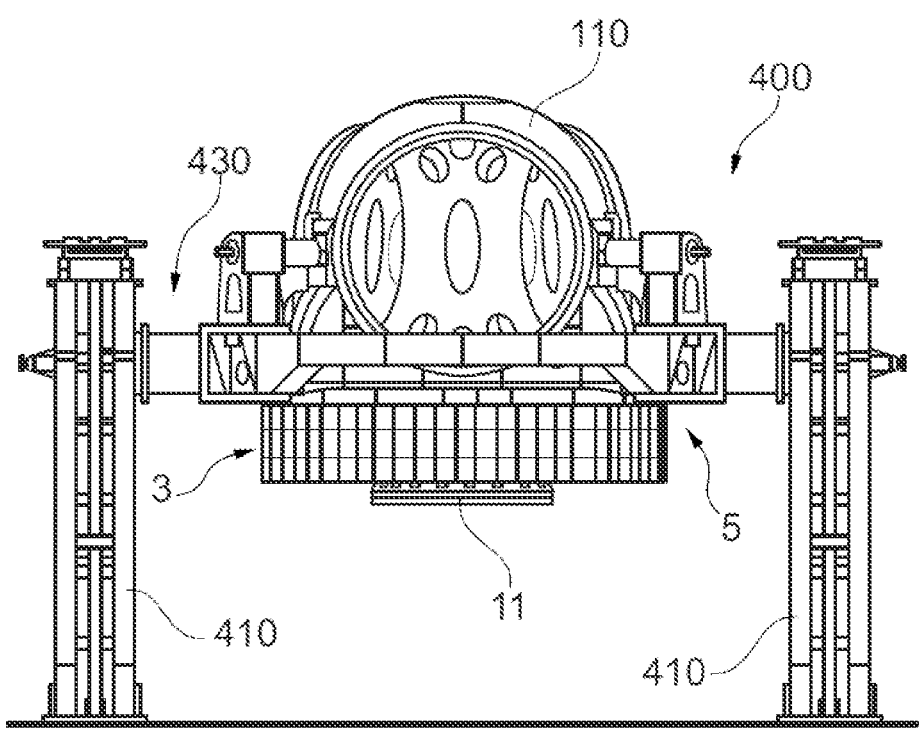
Figure 4F:
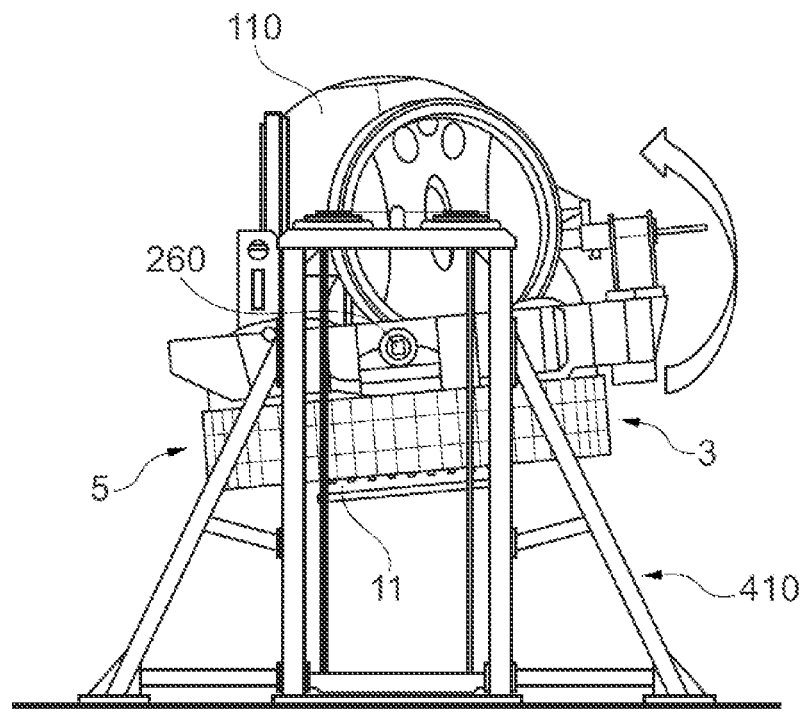
Figure 4G:
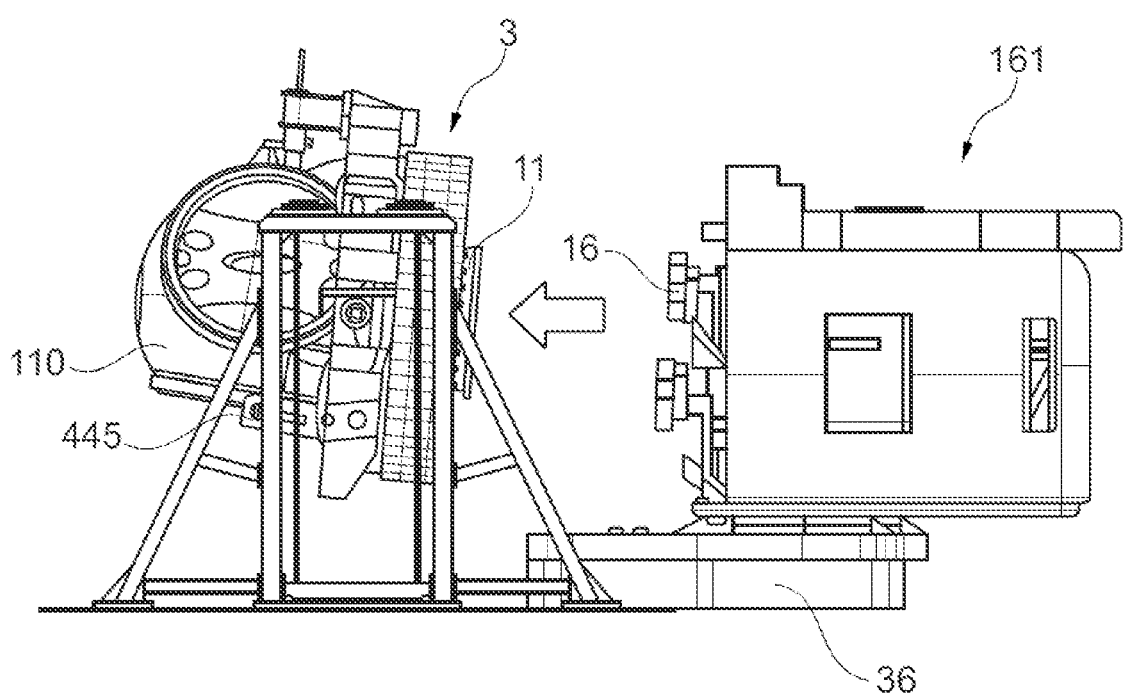

As illustrated in FIG. 4G, a main frame 16 may be incorporated in a nacelle 161, and the nacelle 161 with the main frame 16 may be moved towards the hub-generator assembly 5. A movable platform 36 may horizontally move the nacelle 161.

By performing method 200, a hub 110, a generator 3 and a main frame for a direct drive wind turbine 160 may be attached without damaging an air gap of the generator. By first joining the hub and the generator, and by then flipping the assembly while gripping the hub, the risk of damaging an air gap of the generator may be reduced. As a generator is not directly rotated (i.e. the generator is rotated, but via the hub), adding reinforcements to the generator may not be needed. Attachment of the pieces may be faster and more convenient than first manipulating the generator for attaching it to the frame, and then attaching the hub to the generator. Also, vertically joining the hub and the generator may be simpler and safer than horizontally joining them, as less tools and manipulation of the structures above the ground may be necessary in the first case.

Still with regard to method 200 and FIGS. 4A and 4B, the hub 110 may be gripped before step 210. For example, a tool 400 may grip and lift the hub 110 before moving, e.g. lowering, the hub 110 towards the generator 3. Gripping may include lowering a hub manipulating assembly 430 of a tool 400 such that it surrounds the hub 110. FIG. 4A illustrates that a hub 110 has been arranged below the tool. The hub 110 may be placed on a hub support 37. The hub is placed such that a portion of the hub configured to be attached to a generator 3 points downwards. A hub may be placed such that when operating the tool for gripping the hub, e.g. lowering a hub manipulating assembly 430 of the tool 400, engaging pins 440 for grabbing the hub are positioned between the hub openings for attaching wind turbine blades 120.

Sensors 443 on the hub manipulating assembly 430 of the tool 400 may help to position the tool portion correctly with respect to the hub, e.g. around the hub. A hub manipulating assembly 430 may be moved vertically and horizontally for adjusting its position with respect to the hub. Lateral supports 410 of the tool may help to move the hub manipulating assembly 430 vertically and horizontally.

Gripping the hub 110 may include clamping the hub 110 at two points (at least) between hub openings for attaching wind turbine blades 120. A hub 110 may be particularly reinforced in these regions, which may allow to rotate the hub-generator assembly 5 without deforming the hub 110. Thus, clamping the hub in these regions may be particularly suitable for later on turning the hub-generator assembly 5 and protecting an air gap of the generator.

The hub manipulating assembly 430 of the tool 400 may comprise hub engaging pins 440. The pins 440 may be moved towards the hub, and engage the hub, e.g. a hub surface between the openings for arranging the wind turbine blades 120 as in FIG. 4B. The engaging pins 440 may be configured to mate with receptacles on the hub. A male-female coupling may be formed.

Figure 5:
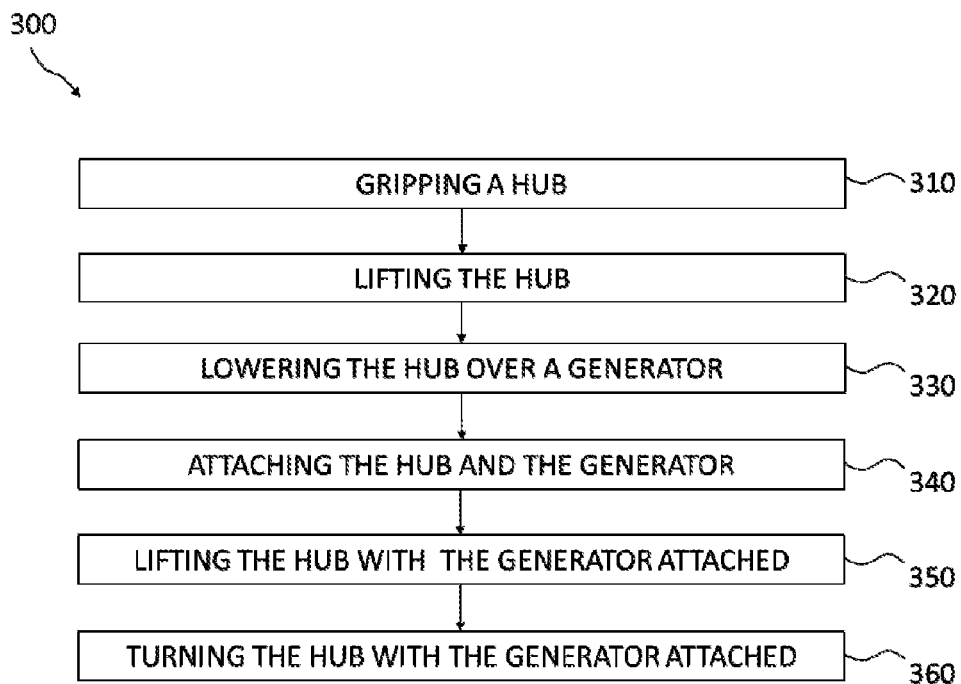
FIG. 5 schematically illustrates a flow chart of a further method.

A further aspect of the present disclosure provides a method 300, schematically illustrated in FIG. 5. The method may be performed by a tool 400 as described further below, e.g. with respect to FIGS. 6-9.

The method comprises, at block 310, gripping a hub 110, wherein a hub portion configured to be attached to a generator 3 is pointing downwards. A hub manipulating assembly 430 of the tool 400 may be lowered. A hub manipulating assembly 430 of a tool 400 may surround the hub 110. The hub 110 may be clamped between hub openings for attaching wind turbine blades. Hub engaging ping 440 may be moved towards the hub 110 to this end. These aspects may be seen in FIGS. 4A and 4B.

The method further comprises, at block 320, lifting the hub. A generator 3, either alone or attached to a front frame 11, may be positioned substantially below the hub 110.

The method further comprises, at blocks 330 and 340, lowering the hub over a generator and attaching the generator 3 to the hub 110 (see FIGS. 4C and 4D). Lowering the hub may comprise measuring a distance between a tool, e.g. the hub manipulating assembly 430, and the hub.

The method further comprises, at block 350, lifting the hub 110 with the generator 3 attached. A tool lifting the hub and the generator can be seen in FIG. 4E.

The method further comprises, at block 360, turning the hub with the generator attached. Rotation may be between 80° and 100°. After the rotation, a main frame 16 and the generator 3 may be attached. A tool rotating a hub-generator assembly can be seen in FIG. 3F. If the generator is provided attached to a front frame 11, the assembly hub-generator may be attached to the main frame 16 through the front frame 11.

Aspects of method 200 can be combined with aspects of method 300. Explanations provided with respect to method 200 apply also for method 300, and vice versa.

A further aspect of the present disclosure provides a tool for manipulating a hub. The tool comprises two lateral supports and a hub manipulating assembly. The lateral supports are configured to support the hub manipulating assembly between them. The hub manipulating assembly is configured to grip a hub. The hub manipulating assembly is also configured to move along the lateral supports and rotate with respect to the lateral supports. This tool may be used to perform the methods 200 and 300 described above.

Figure 6:
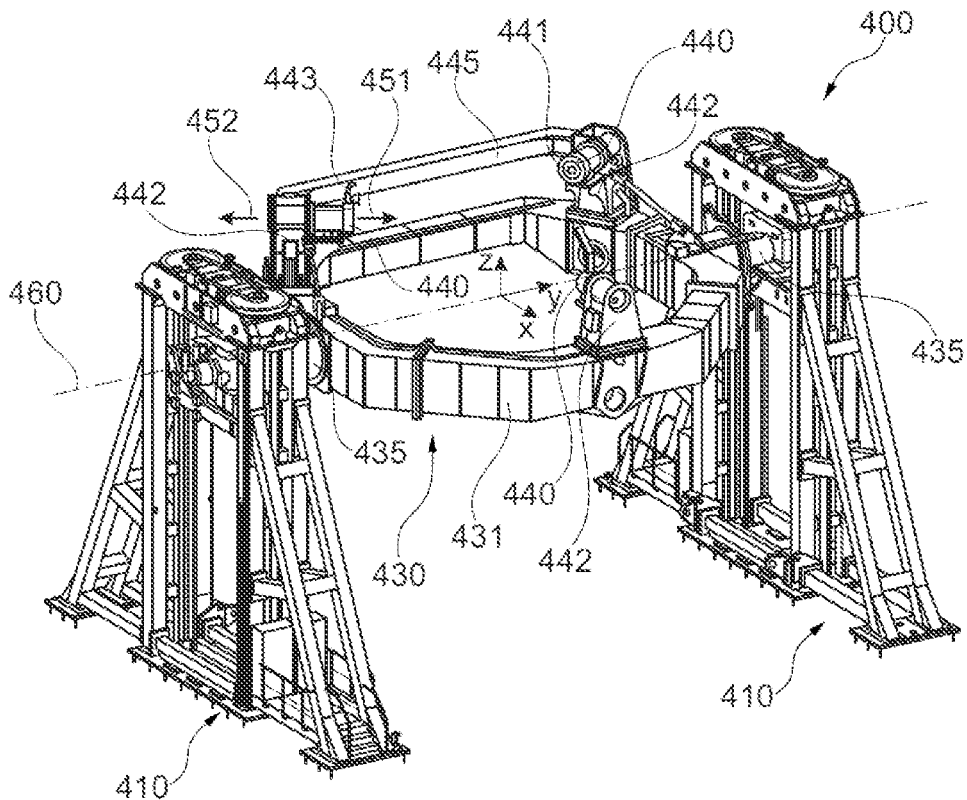
FIG. 6 schematically illustrates a perspective view of an example of a tool for manipulating a wind turbine hub.

FIG. 6 illustrates a perspective view of an example of a tool 400. The tool 400 comprises two lateral supports 410 and a hub manipulating assembly 430. The hub manipulating assembly 430 may rotate around a rotation axis 460. The hub manipulating assembly 430 may comprise a base 431 and two arms 435 attached to opposite sides of the base 431. The arms 435 are movably connected to the lateral supports 410. The direction along a length of the arms 435 defines the axis of rotation 460. When parallel to the ground, the axis of rotation 460 defines a Y axis.

A hub manipulating assembly 430 may be moved parallel to the ground along a Y axis and along an X axis, see FIG. 6. A hub manipulating assembly 430 may also be moved vertically, i.e. perpendicularly to the ground, along a Z axis. The X, Y and Z axes are perpendicular between them. A hub manipulating assembly 430 may also be rotated around any of the X, Y and Z axes. A lateral support 410 may enable to move the hub manipulating assembly in all these directions, as necessary. A lateral support 410 may also enable to rotate the hub manipulating assembly around the axis of rotation 460.

Figure 7:
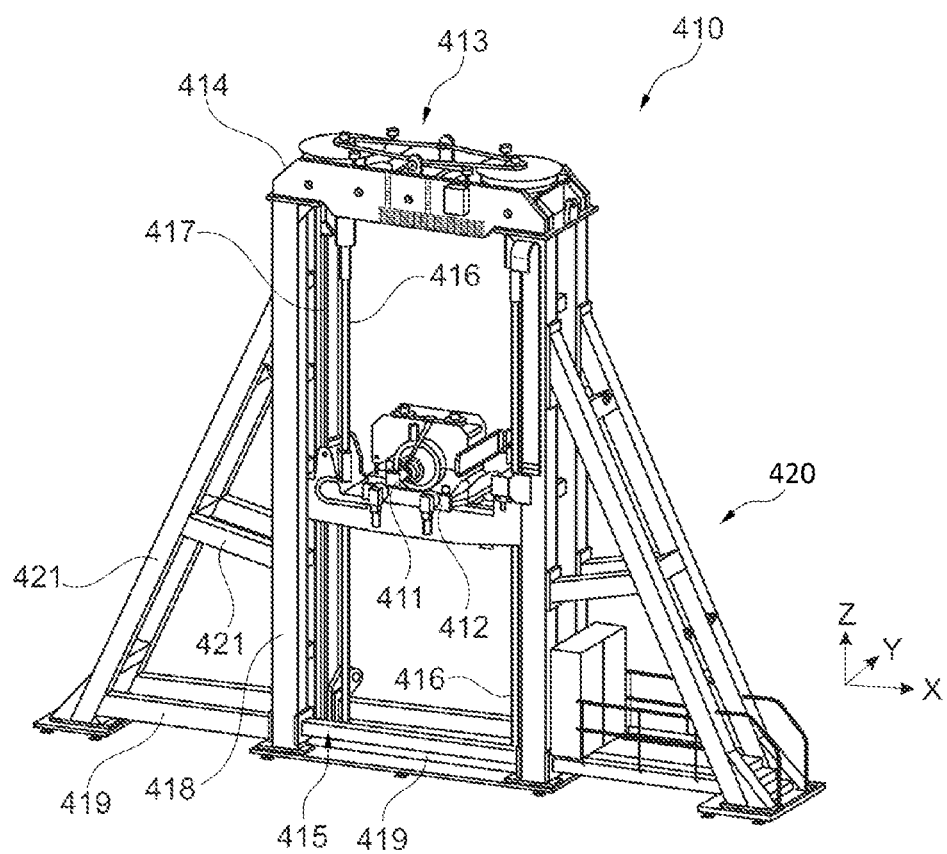
FIG. 7 schematically illustrates a perspective view of an example of a lateral support for the tool of FIG. 6.

FIG. 7 shows a perspective view of an example of a lateral support 410. A lateral support 410 may comprise a hub manipulating assembly engaging element 411. The element 411 is configured to engage and rotate the hub manipulating assembly 430, for example the arms 435 of the hub manipulating assembly 430. An actuator such as a motor may be incorporated to the lateral support 401 and connected to the hub manipulating assembly engaging element 411 for rotating element 411, and thus hub manipulating assembly 430, around the axis of rotation 460, for example around the Y axis. Element 411 may be or may include a shaft.

The hub manipulating assembly engaging element 411 may be moved upwards and downwards along a Z axis. The lateral support 410 may comprise a vertical guiding system 415 to this end. A vertical guiding system 415 may vertically guide the element 411 configured to engage and rotate the hub manipulating assembly 430. A vertical guiding system may comprise two vertical guides 416 along which the hub manipulating assembly engaging element 411 may be vertically displaced. The vertical guides 416 may be screws, for example worm screws. The vertical guides 416 may be separated along an X direction.

The hub manipulating assembly engaging element 411 may be supported by a support 412 for the hub manipulating assembly engaging element. This support 412 may be the one which may be vertically moved in a Z direction along guides 416.

The lateral support 410 may comprise a frame 413 in which the vertical guiding system 415 is arranged. Frame 413 may for example support the vertical guides 416. Besides or instead of vertical guides 416, rails 417 may be provided. Frame 413 may support the rails 417. A support 412 for the engaging element 411 for the hub manipulating assembly 430 may be vertically slid over the rails 417.

A frame 413 may comprise vertical 418 and horizontal 419 beams, and for example have a rectangular shape. A height of a frame 413, which may be a maximum height (length along Z axis) of a lateral support 410, may be sufficient for vertically lifting and rotating a hub 110 attached to a generator 3 for a direct drive wind turbine. Such a height may be between 10 and 15 meters in some examples.

The frame 413 may comprise a cap 414, the cap 414 being a top portion of the frame 413. The cap 414 may include one or more actuators to move the hub manipulating assembly engaging element 411 up and down. For example, motors may rotate the vertical guides 416 for moving the support 412 of engaging element 411, and thus the element 411 for engaging a hub manipulating assembly engaging 430, vertically.

A support 412 for a hub manipulating assembly engaging element 411 may comprise one or more actuators, such as motors or hydraulic linear actuators, for moving the hub manipulating assembly engaging element 411 along a Y and an X axis.

In this way, a hub manipulating assembly 430 may be rotated and moved in any direction, and a hub 110 held by the hub manipulating assembly may be reliably approached and joined to a generator 3.

A lateral support 410 may further comprise one or more reinforcement structures 420. A reinforcement structure 420 may be attached to a frame 413 for increasing the stability and the robustness of the frame, and thus of the lateral support 410. A reinforcement structure 420 may have a triangular shape and may comprise horizontal 419 and inclined 421 beams.

A width (length along an X direction, see FIG. 7) of a lateral support 410 for a hub manipulating assembly 430 may be between 10 and 20 meters in some examples, e.g. between 13 and 17 meters). The two lateral supports 410 may be substantially equal in terms of the guiding system 415, frame 413 and reinforcements 420. A distance between the two lateral supports 410 (holding the hub manipulating assembly 430 along a Y direction, see FIG. 6) may in some examples be between 15 and 30 meters, e.g. between 20 and 25 meters.

Figure 8:
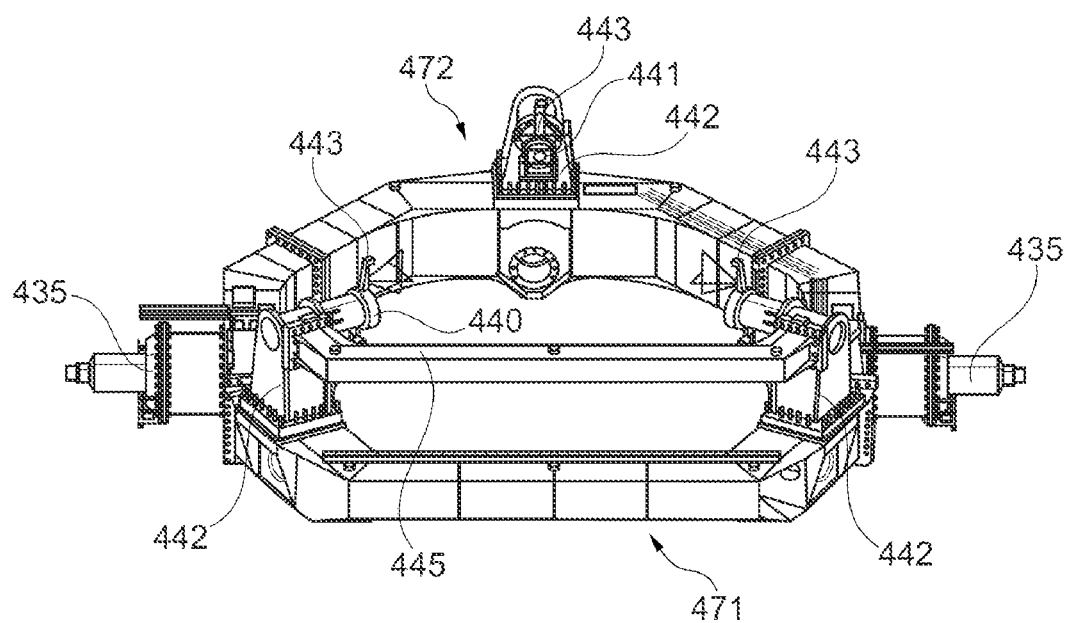
FIG. 8 schematically illustrates a perspective view of an example of a hub manipulating assembly of the tool of FIG. 6.

A perspective view of an example of a hub manipulating assembly 430 can be seen in FIGS. 6 and 8. A hub manipulating assembly 430 may have a base 431. The base 431 may have an annular or a similar shape. The base may be formed by several substantially straight segments joined at their longitudinal ends. The hub manipulating assembly, and in particular the base, may be configured to surround a hub 110 for a direct drive wind turbine 160.

Figure 9:
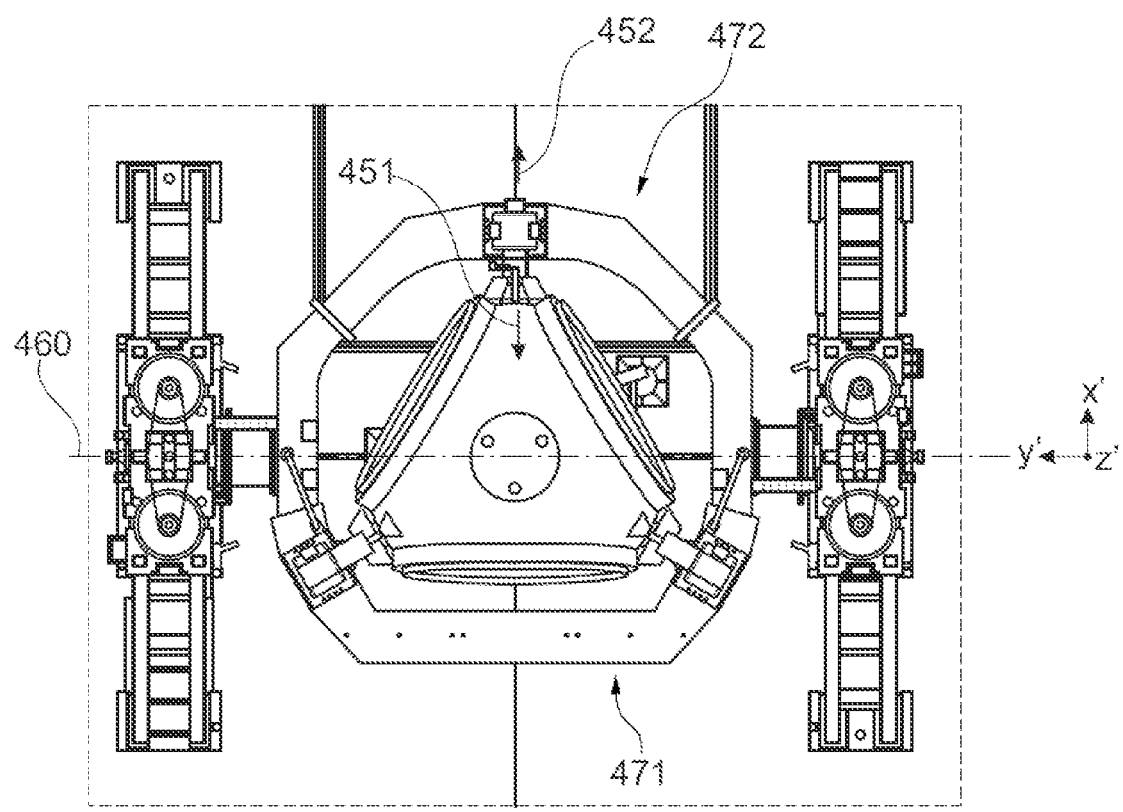
FIG. 9 schematically illustrates a top view of the tool of FIG. 6.

The hub manipulating assembly 430 may comprise one or more hub engaging pins 440. The pins 440 are configured to grab and support a wind turbine hub 110. The pins 440 may clamp a hub 110. The pins 440 may be configured to mate with receptacles on the hub. In FIGS. 6, 8 and 9, three hub engaging pins 440 can be seen. The hub engaging pins 440 can be attached to the hub manipulating assembly base 431 by supports 442 for the hub engaging pins 440. A support 442 for a hub engaging pin 440 may comprise one or more actuators for approaching 451 and distancing 452 the pin 440 to a hub 110. A pin 440 may be hydraulically or electrically actuated in some examples.

FIG. 6 shows a top view of a tool 400 holding a hub 110. In this figure, directions with respect to the hub manipulating assembly 430 can be seen. An axis of rotation 460 defines a first direction, the Y' direction. The Y' axis may overlap the Y axis. A second and a third directions perpendicular to the Y' direction are the X' and Z' directions. In FIG. 6, the X' axis and the Z' axis overlap with the X and Z axes, respectively. However, this will not be the case when the hub manipulating assembly 430 is rotated, as the X' and Z' axes will rotate around the Y' axis.

The axis of rotation or Y' axis divides the hub manipulating assembly in two portions: a first portion 472 and a second portion 471. When the hub manipulating assembly 430 is supporting a hub 110 and a generator 3 for attaching them to a main frame 16 in a substantially horizontal direction (e.g. the Z' axis in FIG. 9 is parallel to the X axis in FIG. 6), the second portion 471 may mainly be carrying the weight of the hub and the generator. Because of this, a first portion 472 may be called an upper portion, and a second portion 471 may be called a lower portion.

The hub manipulating assembly 430 may further comprise a reinforcement bar 445 between two consecutive engaging pins 440, see FIGS. 6 and 8. The reinforcement bar 445 may be provided for helping in supporting the hub 110 and the generator 3. The reinforcement bar 445 may be provided in a second (lower) portion 471 of the hub manipulating assembly 430.

A support 442 of the pins 440 may extend in a Z' direction, and in particular in a +Z' direction (direction pointing to the reader in FIG. 9). When a hub 110, or a hub 110 attached to a generator 3, is lifted or lowered, having the engaging pins 440 above the base 431 may direct the forces exerted on them by the hub towards the base 431, and thus may help to carry and stabilize the loads.

An engaging pin 440 may comprise a ball joint 441, see FIGS. 6 and 8. In particular, each engaging pin 440 may comprise a ball joint 441. A ball joint 441 may help to improve the contact between the engaging pins 440 and the hub 110. A ball joint 441 may also help to absorb the loads exerted on the engaging pins 440, for example when rotating the hub and the generator.

The tool 400 may comprise one or more sensors 443 configured to sense a generator 3 and/or a hub 110. For example, an engaging pin 440, and in particular each engaging pin 440, may comprise one or more sensors 443. Sensors 443 may be comprised in supports for the engaging pins. One or more sensors 443 may be used when lowering the hub manipulating assembly 430 for grabbing the hub 110. Sensors 443 may help to position the hub manipulating assembly 430 and the engaging pins 440 accurately around the hub 110. Sensors may comprise cameras and/or lasers.

One or more sensors 443 may be also provided in the hub manipulating assembly 430 for helping to place the hub manipulating assembly 430 in a desired position. For example, lasers and/or cameras may be provided in the hub manipulating assembly base 431 such that a position of the hub with respect to the generator may be known. The sensors may sense the generator. These sensors 443 may also help to attach the hub manipulating assembly pins 440 to the hub 110 correctly. A sensor suitable for measuring a distance may be used.

The pins 440 may be substantially equally spaced around the hub manipulating assembly 430. For example, if three engaging pins are present, two consecutive pins may be separated about 120 degrees around the base 231. The pins 440 may be configured to grab the hub 110 between the hub openings for attaching the wind turbine blades 120. The region of the hub between these openings may provide sufficient robustness and stiffness for supporting or the forces and loads when rotating the hub and the generator without suffering deformations.

Two pins 440 may be arranged in the second portion 471 of the hub manipulating assembly. The two pins 440 may be below the hub 110 and the generator 3 when rotating a hub-generator assembly and positioning for attaching the set to a main frame 16, therefore support and stabilization of the hub-generator assembly may be enhanced. The two pins 440 in the second portion 471 may be particularly configured to support compression loads during rotation of the hub-generator assembly.

One pin 440 may be arranged in the first portion 472 of the hub manipulating assembly. This pin may be configured to hold the hub 110 during rotation of the hub-generator assembly 5 and to compensate for possible deflections of the assembly during the rotation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the

The invention claimed is:

1. A method for assembling a wind turbine hub, a main frame, and a generator, the method comprising;
   vertically moving one of the wind turbine hub or the generator towards the other of the generator or the wind turbine hub;
   attaching the wind turbine hub and the generator to form a hub-generator assembly;
   rotating the hub-generator assembly while gripping the wind turbine hub, wherein the hub-generator assembly is rotated about a rotation axis that extends through the wind turbine hub; and
   attaching the hub-generator assembly to the main frame.

2. The method of claim 1, wherein the vertically moving step comprises lowering the wind turbine hub towards the generator.

3. The method of claim 1, comprising mounting the generator on a front frame, the front frame configured to be attached to the main frame.

4. The method of claim 3, wherein the front frame includes a portion configured to support the generator, and a portion configured to be attached to the wind turbine hub.

5. The method of claim 1, further comprising lifting the hub-generator assembly before rotating the hub-generator assembly.

6. The method of claim 1, wherein the hub-generator assembly is rotated between 70 and 110 degrees.

7. A method for assembling a wind turbine hub, a main frame, and a generator, the method comprising;
   vertically lowering the wind turbine hub towards the generator;
   attaching the wind turbine hub and the generator to form a hub-generator assembly;
   rotating the hub-generator assembly while gripping the wind turbine hub;
   attaching the hub-generator assembly to the main frame; and
   wherein the lowering step comprises gripping the wind turbine hub.

8. The method of claim 7, wherein the gripping step comprises clamping the wind turbine hub at two points between hub openings for attaching wind turbine blades.

9. A method for assembling a generator and a wind turbine hub, the method comprising:
   gripping the wind turbine hub, wherein a portion of the wind turbine hub configured to be attached to the generator is pointing downwards;
   lifting the wind turbine hub;
   lowering the wind turbine hub over the generator;
   attaching the generator to the wind turbine hub;
   lifting the wind turbine hub with the generator attached thereto; and
   rotating the wind turbine hub with the generator attached thereto.

10. The method of claim 9, wherein the gripping step comprises surrounding the wind hub by a hub manipulating assembly of a tool.

11. The method of claim 9, wherein the gripping step comprises clamping the wind turbine hub between hub openings for attaching wind turbine blades.

12. The method of claim 9, wherein the wind turbine hub and the generator are rotated between 80 degrees and 100 degrees.

13. The method of claim 9, wherein the lowering step comprises measuring a distance between a tool and the wind turbine hub.

* * * * *